United States Patent
Shimada et al.

(10) Patent No.: US 6,598,945 B2
(45) Date of Patent: Jul. 29, 2003

(54) CONTROL APPARATUS AND METHOD OF VEHICLE BRAKING AND DRIVING FORCE

(75) Inventors: Michihito Shimada, Susono (JP); Satoru Niwa, Susono (JP); Junichi Sakamoto, Gotenba (JP); Masahiro Hara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 09/956,956

(22) Filed: Sep. 21, 2001

(65) Prior Publication Data

US 2002/0036429 A1 Mar. 28, 2002

(30) Foreign Application Priority Data

Sep. 27, 2000 (JP) ........................ 2000-294739

(51) Int. Cl.[7] ................................ B60T 8/64
(52) U.S. Cl. ........................... 303/152; 303/3
(58) Field of Search ............... 303/151, 152, 303/3, 20, 15

(56) References Cited

U.S. PATENT DOCUMENTS 5,450,324 A  *  9/1995  Cikanek ................ 701/108
5,853,229 A  * 12/1998  Willmann et al. ........... 303/3
5,895,100 A  *  4/1999  Ito et al. .................. 303/152
6,454,364 B1 *  9/2002  Niwa et al. ............... 303/152
2002/0030408 A1    3/2002  Niwa et al.
2002/0036429 A1    3/2002  Shimada et al.

FOREIGN PATENT DOCUMENTS

JP    A 11-105688    4/1999

* cited by examiner

*Primary Examiner*—Jack Lavinder
*Assistant Examiner*—Robert A. Siconolfi
(74) *Attorney, Agent, or Firm*—Oliff & Berridge

(57) ABSTRACT

A braking and driving force control apparatus and method are for a vehicle having a frictional braking device for applying a braking force individually to each wheel and a regenerative braking device for generating a common braking force to a plurality of wheels. A target braking force is calculated on the basis of a driver's braking operation or traction control. The regenerative braking device is controlled so as to achieve the smallest target braking force of the target braking forces of the plurality of wheels. The frictional braking device is controlled so as to achieve the target braking force of another wheel, different from the wheel having the smallest target braking force, in cooperation with the regenerative braking device. Thus, the efficiency of regenerating energy is enhanced.

25 Claims, 11 Drawing Sheets

CONTROL APPARATUS AND METHOD OF VEHICLE BRAKING AND DRIVING FORCE

INCORPORATION BY REFERENCE

The disclosure of Japanese Patent Application No. 2000-294739 filed on Sep. 27, 2000, including the specification, drawings and abstract is incorporated herein by reference in its entirety.

BACKGROUND OF THE INVENTION

1. Field of Invention

The invention relates to a vehicle braking and driving force control apparatus and a control method thereof. It relates more particularly to a vehicle braking and driving force control apparatus having a frictional braking device for applying a braking force individually to each wheel, and a regenerative braking device for applying a common braking force to a plurality of wheels, and to a control method thereof.

2. Description of Related Art

A well-known vehicle braking force control apparatus of an automobile and the like comprises, for example as disclosed by the present applicant in Japanese Patent Application Laid-Open No. 11-105688, a regenerative braking device and a frictional braking device (hydraulic braking device), in which both regenerative braking force and frictional braking force are increased when there is a need to suddenly increase the braking torque at the time of traction control, and in which the frictional braking force is kept constant and the regenerative braking force is decreased gradually when there is a need to gradually decrease the braking torque.

According to such braking force control apparatus, the braking torque can be increased quickly or decreased smoothly by making use of the characteristics of the regenerative braking device and the frictional braking device. Thus, the traction is controlled by using both regenerative braking force and frictional braking force, and therefore as compared with the case of use of the frictional braking force only at the time of traction control, the regeneration efficiency is enhanced and the fuel consumption of the vehicle is improved.

In the conventional braking force control apparatus as described above, however, since the regenerative braking device and the frictional braking device are not controlled so as to enhance the regeneration efficiency when applying a braking force to the wheels at the time of traction control, from the viewpoint of the regeneration efficiency, the regenerative braking device and the frictional braking device are not used most efficiently, and hence there is room for improvement in this respect in the conventional braking force control apparatus.

SUMMARY OF THE INVENTION

The invention is devised in light of the above problems of the conventional braking force control apparatus for vehicles comprising a regenerative braking device and a frictional braking device. It is a primary object of the invention to enhance the regeneration efficiency in a situation of automatic and individual control of a braking force or a driving force of each wheel during motion control of a vehicle, by using the regenerative braking device and the frictional braking device so as to achieve a high regeneration efficiency in a situation of automatic and individual control of the braking force or the driving force of each wheel by motion control of the vehicle such as traction control.

This and/or other objects are achieved by a braking and driving force control apparatus for a vehicle having a frictional braking device for applying a braking force individually to each wheel, and a regenerative braking device for generating a common braking force to a plurality of wheels. According to one aspect of the invention, the braking and driving force control apparatus includes a controller that: (a) calculates a target braking force of each wheel in response to a running state of the vehicle; and (b) controls the frictional braking device and the regenerative braking device so that the braking force of each wheel becomes the target braking force, in which the controller controls the regenerative braking device so as to achieve the smallest target braking force of the target braking forces of the plurality of wheels, and controls the frictional braking device so as to achieve the target braking force of another wheel, different from the wheel having the smallest target braking force, in cooperation with the regenerative braking device.

The object is also achieved by a braking and driving force control method for a vehicle having a frictional braking device for applying a braking force individually to each wheel, and a regenerative braking device for generating a common braking force to a plurality of wheels, comprising the steps of:

calculating a target braking force of each wheel in response to a running state of the vehicle;

controlling the regenerative braking device so as to achieve the smallest target braking force of the target braking forces of the plurality of wheels; and controlling the frictional braking device so as to achieve the target braking force of another wheel, different from the wheel having the smallest target braking force, in cooperation with the regenerative braking device.

According to such braking and driving force control apparatus and method, as for the wheel with the smallest target braking force, the target braking force is achieved by the regenerative braking force, and as for the other wheels, the target braking force is achieved by the sum of the regenerative braking force and the frictional braking force. Therefore, each wheel can be braked at the highest regeneration efficiency in a situation of automatic control of the braking force or the driving force of each wheel during motion control.

Another aspect of the invention relates to a braking and driving force control apparatus for a vehicle having a frictional braking device for applying a braking force individually to each wheel, a regenerative braking device for generating a common braking force to a plurality of wheels, and a drive device for generating a common driving force to the plurality of wheels. The braking and driving force control apparatus includes a controller that: (a) calculates a target braking force of each wheel in response to a running state of the vehicle; (b) calculates a target driving force of each wheel in response to the running state of the vehicle; and (c) controls the frictional braking device, the regenerative braking device, and the drive device so that the braking and driving force of each wheel becomes the target braking and driving force on the basis of the target braking force and target driving force. The controller calculates the entire target driving force of the plurality of wheels on the basis of the target driving force of each wheel, and calculates the entire target braking and driving force of the plurality of wheels on the basis of the entire target driving force of the plurality of wheels and the smallest target braking force of the target braking forces of the plurality of wheels. When the entire target braking and driving force of the plurality of wheels is a driving force, the controller controls the drive device so as to achieve the entire target braking and driving force of the plurality of wheels, and controls the frictional braking device so as to achieve the target braking force of another wheel, different from a wheel having the smallest target braking force. When the entire target braking and driving force of the plurality of wheels is a braking force, the controller controls the regenerative braking device so as to achieve the entire target braking and driving force of the plurality of wheels, and controls the frictional braking device so as to achieve the target braking force of the another wheel, different from the wheel having the smallest target braking force in cooperation with the regenerative braking device.

The object is also achieved by a braking and driving force control method for a vehicle having a frictional braking device for applying a braking force individually to each wheel, a regenerative braking device for generating a common braking force to a plurality of wheels, and a drive device for generating a driving force to the plurality of wheels, comprising the steps of:

calculating a target braking force and a target driving force of each wheel in response to a running state of the vehicle;

calculating the entire target braking and driving force of the plurality of wheels on the basis of the entire target driving force of the plurality of wheels and the smallest target braking force of the target braking forces of the plurality of wheels;

when the entire target braking and driving force of the plurality of wheels is a driving force, controlling the drive device so as to achieve the entire target braking and driving force of the plurality of wheels, and controlling the frictional braking device so as to achieve the target braking force of another wheel, different from a wheel having the smallest target braking force, and when the entire target braking and driving force of the plurality of wheels is a braking force, controlling the regenerative braking device so as to achieve the entire target braking and driving force of the plurality of wheels, and controlling the frictional braking device so as to achieve the target braking force of the another wheel, different from the wheel having the smallest target braking force, in cooperation with the regenerative braking device.

According to such braking and driving force control apparatus and method, when the entire target braking and driving force of the plurality of wheels is a driving force, since the frictional braking device and drive device are controlled so as to achieve the target braking force and target driving force of each wheel, control of the braking force and driving force of each wheel by motion control can be achieved reliably. Similarly, when the entire target braking and driving force of the plurality of wheels is a braking force, since the frictional braking device and regenerative braking device are controlled so as to achieve the target braking force and target driving force of each wheel, the target braking force is achieved by the regenerative braking force as for the wheel having the smallest target braking force, while the target braking force is achieved by the sum of the regenerative braking force and the frictional braking force as for the other wheels. Therefore, each wheel can be braked at the highest regeneration efficiency in a situation of automatic and individual control of braking force or driving force of each wheel by motion control.

BRIEF DESCRIPTION OF THE DRAWINGS

The above mentioned and other objects, features, advantages, technical and industrial significance of this invention will be better understood by reading the following detailed description of the preferred embodiments of the invention, when considered in connection with the accompanying drawings, in which.

DETAILED DESCRIPTION OF PREFERRED EMBODIMENTS

In the following description and the accompanying drawings, the invention will be described in more detail with reference to exemplary, preferred embodiments.

Figure 1:
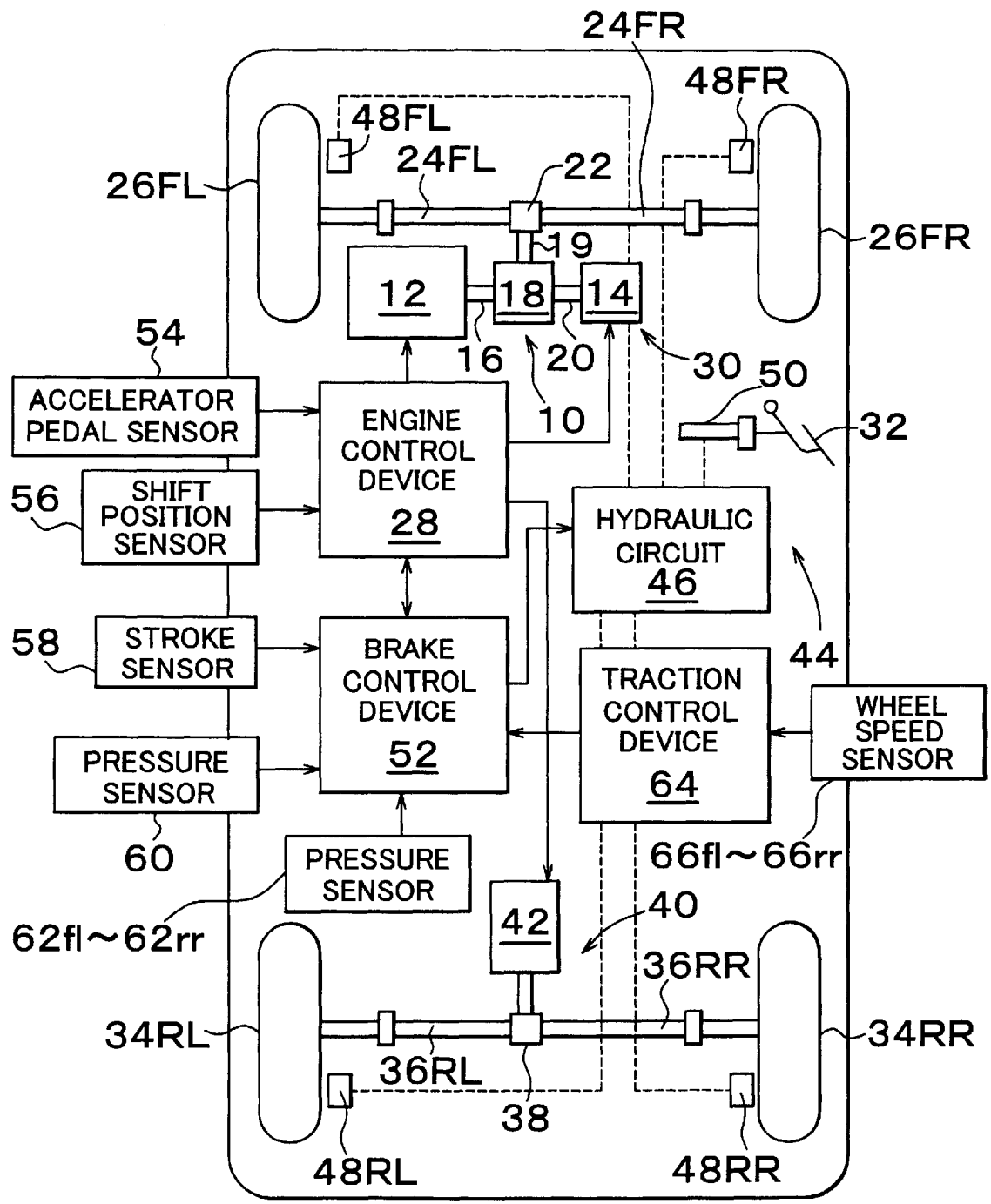
FIG. 1 is a schematic structural diagram showing a first embodiment of a braking and driving force control apparatus of the invention applied to a four-wheel drive vehicle having a hybrid system.

FIG. 1 is a schematic structural diagram showing a first embodiment of a braking and driving force control apparatus of the invention applied to a four-wheel drive vehicle having a hybrid system.

In FIG. 1, reference numeral 10 denotes a hybrid system for driving front wheels. The hybrid system 10 includes a gasoline engine 12 and a motor-generator 14. An output shaft 16 of the gasoline engine 12 is coupled to an input shaft of a continuously variable transmission 18 incorporating a clutch, and the input shaft of the continuously variable transmission 18 also is coupled to an output shaft 20 of the motor-generator 14. Rotation of an output shaft 19 of the continuously variable transmission 18 is transmitted to axles 24FR and 24FL of right and left front wheels through a front wheel differential 22, and right and left front wheels 26FR and 26FL are rotated and driven.

The gasoline engine 12 and motor-generator 14 of the hybrid system 10 are controlled by an engine control device 28 responding to the depression amount of the accelerator pedal (not shown) by the driver and the vehicle running state. The motor-generator 14 also functions as a generator for a front wheel regenerative braking device 30, and the function as a regenerative generator (regenerative brake) is also controlled by the engine control device 28.

In the illustrated embodiment, in particular, the hybrid system 10 generates a driving force or an engine braking force by the gasoline engine 12 or by the gasoline engine 12 and the motor-generator 14 in the normal running state when a shift lever (not shown) is in a D range (normal operation mode), generates a driving force only by the motor-generator 14 when the shift lever is in the D range but the load is low (electric vehicle mode), and generates a driving force or an engine braking force by the gasoline engine 12 and the motor-generator 14 also when the shift lever is in a B range. However, in this case, the engine braking force is higher than in the D range (engine brake mode), and when the shift lever is in the D range and the brake pedal 32 is depressed by the driver, the motor-generator 14 also functions as a regenerative generator.

In FIG. 1, rotation of right and left rear wheels 34RR and 34RL is transmitted to a motor-generator 42 of a rear wheel regenerative braking device 40 by way of right and left rear wheel axles 36RR and 36RL and a rear wheel differential 38. The right and left rear wheels 34RR and 34RL are driven, as required, by the driving force of the motor-generator 42, and regenerative brake and right and left rear wheel drive by the motor-generator 42 are also controlled by the engine control device 28.

Frictional braking force of the right and left front wheels 26FR, 26FL and right and left rear wheels 34RR, 34RL is individually controlled as the braking pressure of the corresponding wheel cylinders 48FR, 48FL, 48RR, 48RL is controlled by a hydraulic circuit 46 of a frictional braking device 44. Although not shown, the hydraulic circuit 46 comprises a reservoir, an oil pump, various valve devices and the like, and the braking pressure of each wheel cylinder is usually controlled by a brake control device 52 responding to the depression amount of the brake pedal 32 by the driver and the pressure of the master cylinder 50 actuated in response to depression of the brake pedal 32.

In the engine control device 28, a signal showing the depression amount of the accelerator pedal from an accelerator pedal sensor 54, a signal showing the shift position of the continuously variable transmission 18 from a shift position sensor 56, and signals showing a front wheel final target braking and driving torque KFTf and a rear wheel final target braking and driving torque KFTr from the brake control device 52 are input, respectively.

In the brake control device 52, a signal showing a depression stroke Sp of the brake pedal 32 from a stroke sensor 58, a signal showing a pressure Pm of the master cylinder 50 from a pressure sensor 60, and signals showing braking pressures Pfr, Pfl, Prr, Prl of the wheel cylinders 48FR, 48FL, 48RR, 48RL of the right and left front wheels and right and left rear wheels from pressure sensors 62fr, 62fl, 62rr, 62rl are input, and signals showing target driving forces PPWfr, PPWfl, PPWrr, PPWrl or target braking forces PBWfr, PBWfl, PBWrr, PBWrl of right and left front wheels and right and left rear wheels are also input, respectively, from a traction control device 64 serving as the vehicle motion control device.

In the traction control device 64, signals showing wheel speeds VWfr, VWfl, VWrr, VWrl of right and left front wheels and right and left rear wheels are input, respectively, from wheel speed sensors 66fr, 66fl, 66rr, 66rl. The traction control device 64 calculates a drive slip rate of each wheel according to the wheel speed. When the drive slip rate of any wheel exceeds a reference value and the traction control starting condition is established, the target wheel speed for keeping the drive slip rate of this wheel at a suitable slip rate until a traction control terminating condition is established is calculated, and a target driving force PPWi (a positive value) or a target braking force PBWi (a negative value) (i=fr, fl, rr, rl) of the wheel is calculated on the basis of the target wheel speed.

The engine control device 28, the brake control device 52, and the traction control device 64 may be one or separate general-purpose microcomputers comprising, for example, CPU, ROM, RAM, and input and output devices, respectively.

Figure 2:
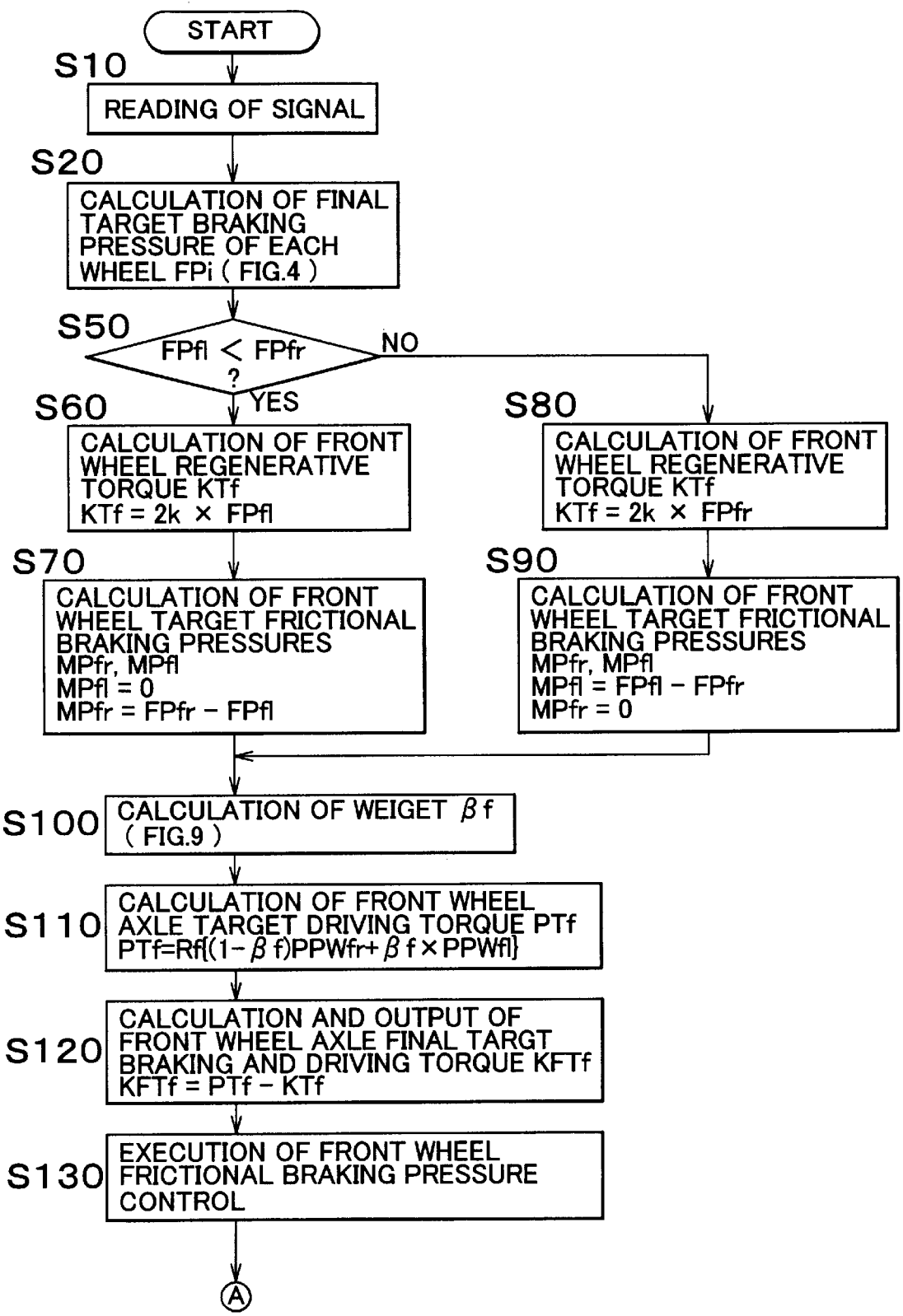
FIG. 2 is a flowchart showing a first half of a main routine of braking force control by the braking and driving force control apparatus in the first embodiment.
Figure 3:
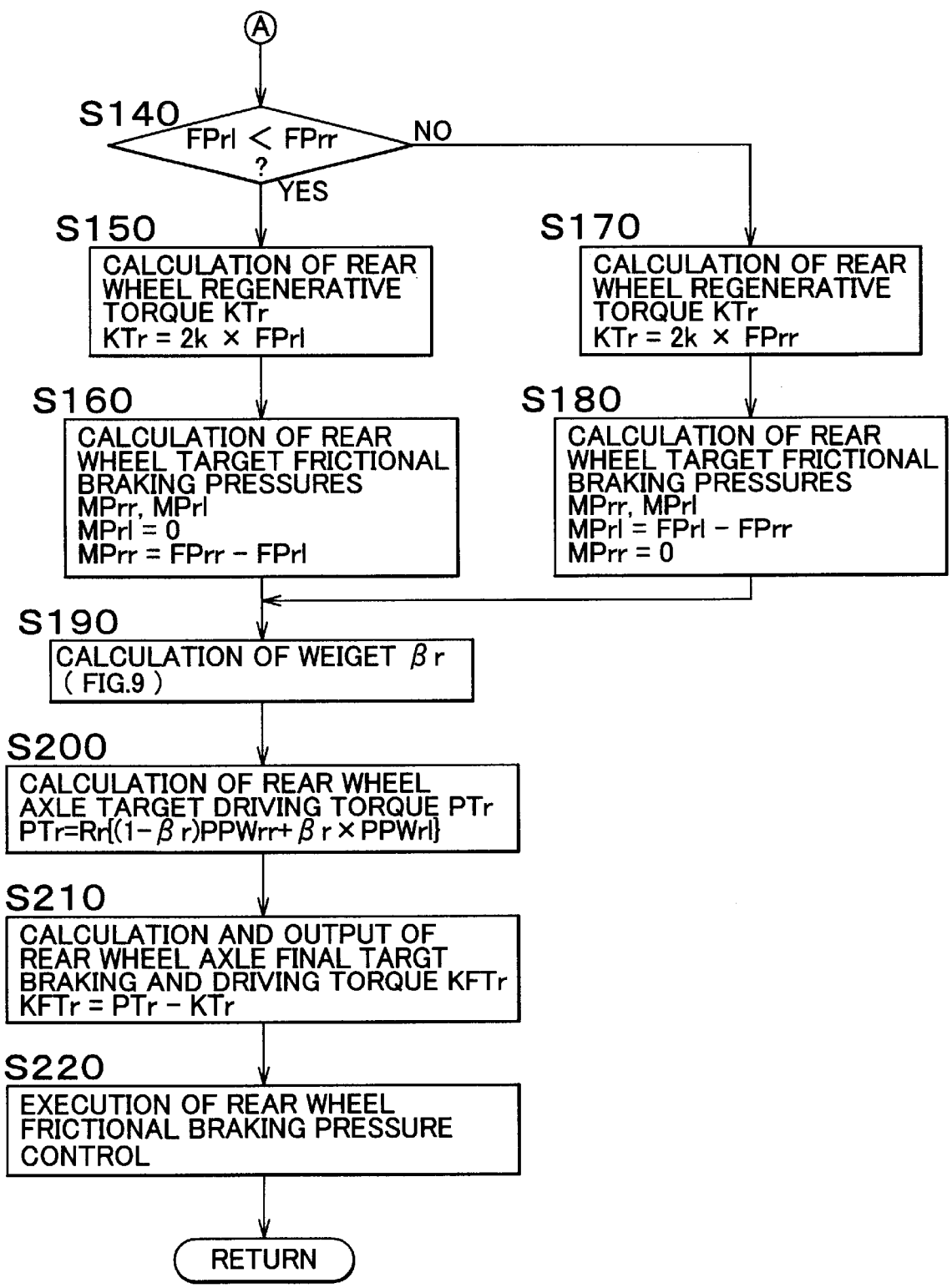
FIG. 3 is a flowchart showing a second half of the main routine of braking force control by the braking and driving force control apparatus in the first embodiment.

As described in detail below, the brake control device 52 controls the braking and driving force of the hybrid system 10 and the braking and driving force of the rear wheel motor-generator 42, and also controls the frictional braking device 44, according to the routine shown in FIG. 2 to FIG. 4, so that the braking and driving force of each wheel becomes the target braking and driving force, and that the regeneration efficiency of the front wheel and rear wheel regenerative braking devices 30, 40 may be maximum.

Figure 4:
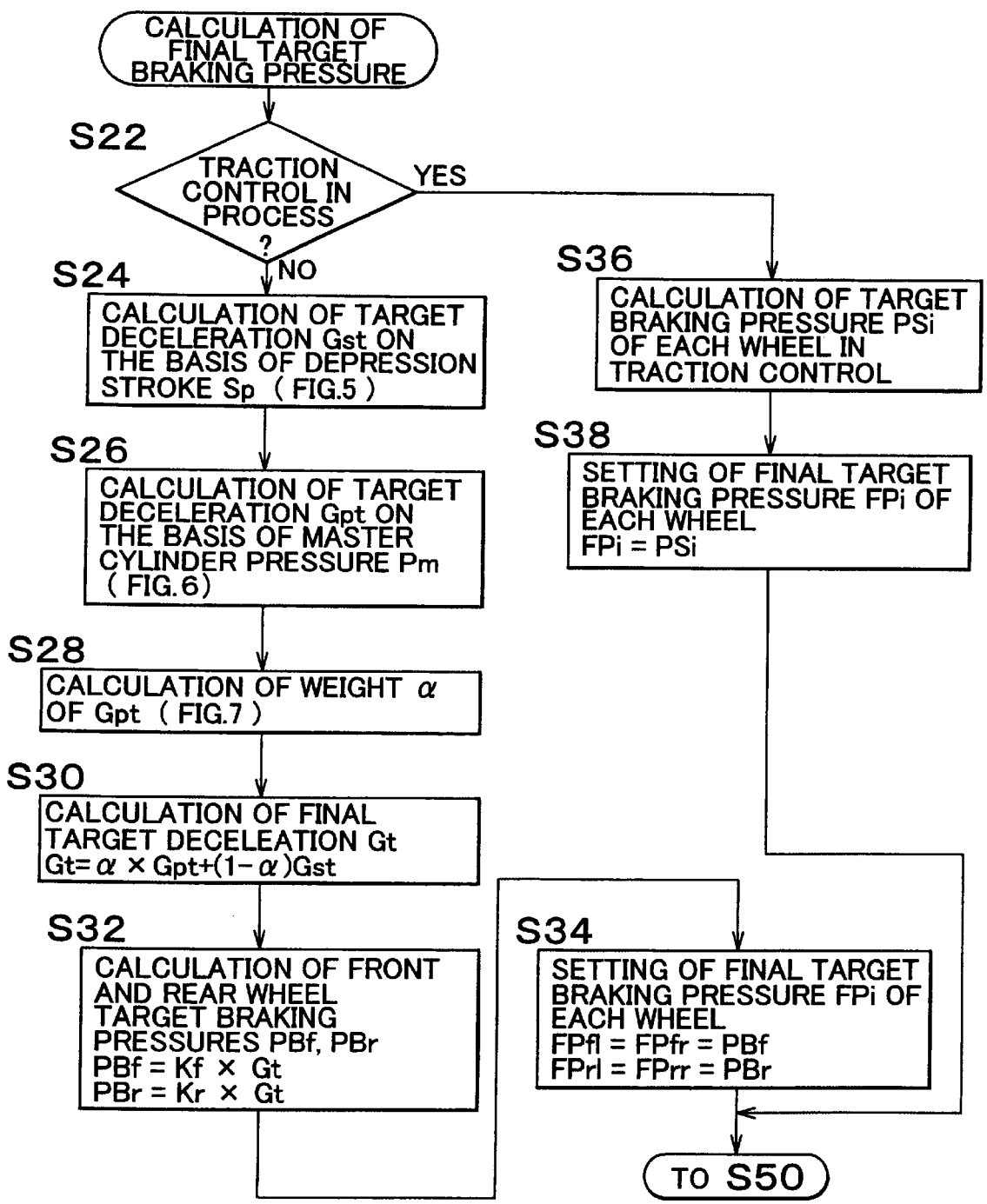
FIG. 4 is a flowchart showing a sub-routine of final target braking pressure calculation of each wheel executed in step S20 in FIG. 2.

In particular, according to the routine shown in FIG. 4, the brake control device 52 calculates a final target braking pressure FPi (i=fr, fl, rr, rl) of each wheel, on the basis of the depression stroke Sp of brake pedal 32, the master cylinder pressure Pm, and the front and rear distribution rate of braking force in a normal braking mode in response to the driver's braking operation, or on the basis of a target braking force PBWi in a traction control mode.

The brake control device 52 also calculates a front wheel regenerative torque KTf on the basis of the smaller value of the right and left front wheel final target braking forces FPfr and FPfl. Device 52 also calculates a target frictional braking pressure MPfr or MPfl for achieving the target braking force corresponding to the final target braking pressure of the wheel in cooperation with the regenerative brake by the regenerative torque KTf of the other front wheel (i.e., the front wheel having the larger final target braking force). The target frictional braking pressure MPfr or MPfl of the wheel having the smaller final target braking force is set to 0.

Moreover, the brake control device 52 calculates a target drive torque PTf of the front wheel axle corresponding to the entire target driving force of right and left front wheels on the basis of the right and left front wheel target driving forces PPWfr and PPWfl input from the traction control device 64, calculates a final target braking and driving torque KFTf of the front wheel axle corresponding to the entire target braking and driving force of right and left front wheels as a value obtained by subtracting the front wheel regenerative torque KTf from the target driving torque PTf, outputs a signal showing the final target braking and driving torque KFTf to the engine control device 28, and controls the frictional braking device 44 so that the frictional braking pressures of the front left wheel and front right wheel may be target frictional braking pressures MPfr and MPfl, respectively.

The engine control device 28 controls the output of the gasoline engine 12 or the motor-generator 14 of the hybrid system 10 so that the driving torque of the front wheel axle becomes the final target braking and driving torque KFTf when the final target braking and driving torque KFTf is a positive value, or controls the motor-generator 14 so that the driving torque of the front wheel axle becomes the final target braking and driving torque KFTf when the final target braking and driving torque KFTf is a negative value, so that regenerative brake is applied by the regenerative braking device 30.

Similarly, the brake control device 52 calculates the rear wheel regenerative torque KTr on the basis of the smaller value of the right and left rear wheel final target braking pressures FPrr and FPrl. Device 52 also calculates the target frictional braking pressure MPrr or MPrl for achieving the target braking force corresponding to the final target braking pressure of the wheel in cooperation with the regenerative brake by the regenerative torque KTr of the other rear wheel (i.e., the rear wheel having the larger final target braking force). The target frictional braking pressure MPrr or MPrl of the wheel having the smaller final target braking force is set to 0.

Further, the brake control device 52 calculates the target drive torque PTr of the rear wheel axle corresponding to the entire target driving force of right and left rear wheels on the basis of the right and left rear wheel target driving forces PPWrr and PPWrl input from the traction control device 64, calculates the final target braking and driving torque KFTr of the rear wheel axle corresponding to the entire target braking and driving force of right and left rear wheels as a value obtained by subtracting the rear wheel regenerative torque KTr from the target driving torque PTr, outputs a signal showing the final target braking and driving torque KFTr to the engine control device 28, and controls the frictional braking device 44 so that the frictional braking pressures of the rear left wheel and rear right wheel becomes the target frictional braking pressures MPrr and MPrl, respectively.

The engine control device 28 controls the output of the motor-generator 42 so that the driving torque of the rear wheel axle becomes the final target braking and driving torque KFTr when the final target braking and driving torque KFTr is a positive value, or controls the motor-generator 42 so that the driving torque of the rear wheel axle becomes the final target braking and driving torque KFTr when the final target braking and driving torque KFTr is a negative value, so that regenerative brake is applied by a rear wheel regenerative braking device 40.

Meanwhile, control of the operation mode of the hybrid system 10 by the engine control device 28 and control of the gasoline engine 12 while traction control is not performed are not the main subjects of the invention, and these control processes may be executed by any known procedure in the technical field of the invention.

Referring now to flowcharts shown in FIG. 2 to FIG. 4, the braking and driving force control routine by the brake control device 52 of the first embodiment will be explained. Control by the flowcharts shown in FIG. 2 to FIG. 4 is started by turning on the ignition switch (not shown), and is executed repeatedly at predetermined time intervals.

First, at step S10, signals including the signal showing the depression stroke Sp of the brake pedal 32 detected by the stroke sensor 58 are read in, and at step S20, according to the routine shown in FIG. 4, the final target braking pressure FPi (i=fr, fl, rr, rl) of each wheel is calculated.

Proceeding to step S50, it is judged whether or not the final target braking pressure FPfl of front left wheel is smaller than the final target braking pressure FPfr of front right wheel. When judged affirmatively, the routine proceeds to step S60.

At step S60, supposing k to be the coefficient for converting braking pressure to the braking torque, the front wheel regenerative torque KTf is calculated, that is, the regenerative torque for achieving the braking force corresponding to the right and left front wheel final target braking pressures FPfr and FPfl as much as possible by using the front wheel regenerative braking device 30 is calculated according to the following formula (1).

$$KTf = 2k \times FPfl \tag{1}$$

At step S70, right and left front wheel final frictional braking pressures MPfr and MPfl are calculated according to the following formulas (2) and (3).

$$MPfl = 0 \tag{2}$$

$$MPfr = FPfr - FPfl \tag{3}$$

On the other hand, when judged negatively at step S50, the routine proceeds to step S80. At step 80, the front wheel regenerative torque KTf is calculated according to the following formula (4), and at step S90, right and left front wheel target frictional braking pressures MPfr and MPfl are calculated according to the following formulas (5) and (6).

$$KTf = 2k \times FPfr \tag{4}$$

$$MPfl = FPfl - FPfr \tag{5}$$

$$MPfr = 0 \tag{6}$$

Figure 9:
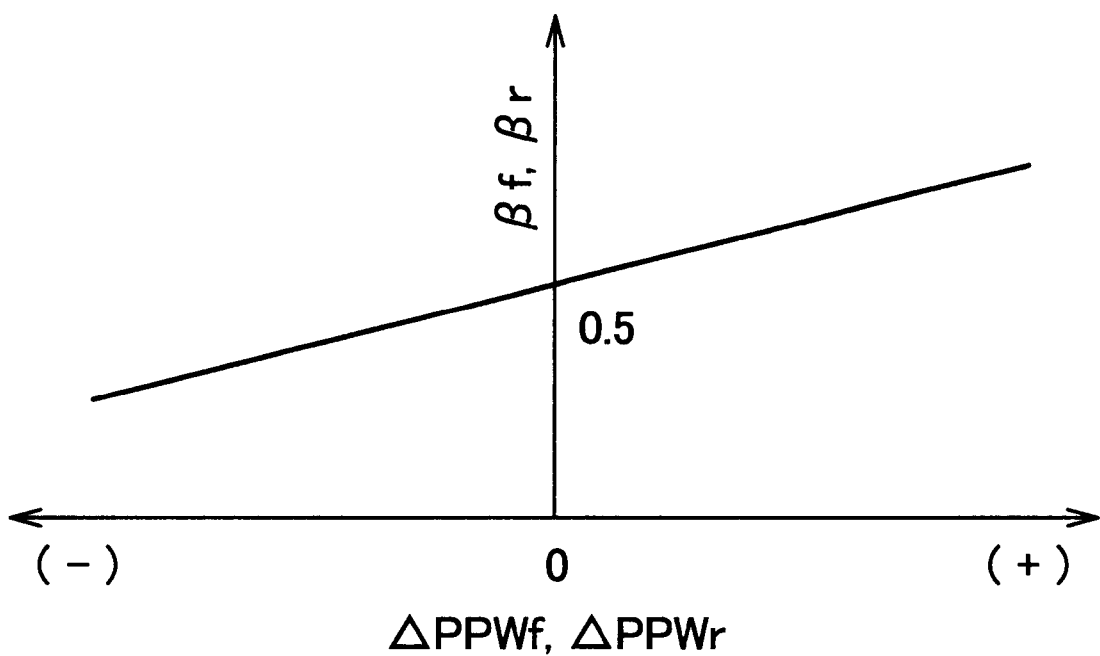
FIG. 9 is a graph showing the relation of deviation $\Delta$PPWf of driving torque instruction values of right and left front wheels and deviation $\Delta$PPWr of driving torque instruction values of right and left rear wheels, and weights $\beta$f and $\beta$r.

At step S100, deviation ΔPPWf=PPWfl−PPWfr of right and left front wheel target driving torque instruction values input from the traction control device 64 is calculated, and on the basis of the deviation ΔPPWf, the weight βf is calculated from a map corresponding to a graph shown in FIG. 9.

At step S110, assuming Rf to be a front wheel tire radius, the target driving torque PTf of the front wheel axle is calculated according to the following formula (7).

$$PTf = Rfl\{(1-\beta f) \times PPWfr + \beta f \times PPWfl\} \tag{7}$$

At step S120, the final target braking and driving torque KFTf of the front wheel axle is calculated according to the following formula (8), and a signal showing this final target braking and driving torque KFTf is output to the engine control device 28.

$$KFTf = PTf - KTf \tag{8}$$

At step S130, on the basis of the right and left front wheel target frictional braking pressures MPfr and MPfl calculated at step S70 or S90, the right and left front wheel braking pressures Pfr and Pfl are controlled by pressure feedback so as to be the corresponding target braking pressures MPfr and MPfl, respectively.

Similarly, at step S140, it is judged whether or not the final target braking pressure FPrl of the rear left wheel is smaller than the final target braking pressure FPrr of the rear right wheel, and when judged affirmatively, the routine proceeds to step S150.

At step S150, the rear wheel regenerative torque KTr is calculated, that is, the regenerative torque for achieving the braking force corresponding to the right and left rear wheel final target braking pressures FPrr and FPrl as much as possible by using the rear wheel regenerative braking device 40 is calculated according to the following formula (9).

$$KTr = 2k \times FPrl \tag{9}$$

At step S160, right and left rear wheel final frictional braking pressures MPrr and MPrl are calculated according to the following formulas (10) and (11).

$$MPrl = 0 \tag{10}$$

$$MPrr = FPrr - FPrl \tag{11}$$

On the other hand, when judged negatively at step S140, the routine proceeds to step S170. At step S170, the rear wheel regenerative torque KTr is calculated according to the following formula (12), and at step S180, right and left rear wheel target frictional braking pressures MPrr and MPrl are calculated according to the following formulas (13) and (14).

$$KTr = 2k \times FPrr \tag{12}$$

$$MPrl = FPrl - FPrr \tag{13}$$

$$MPrr = 0 \tag{14}$$

At step S190, deviation $\Delta PPWr = PPWrl - PPWrr$ of right and left rear wheel target driving torque instruction values input from the traction control device 64 is calculated, and on the basis of the deviation $\Delta PPWr$, the weight $\beta r$ is calculated from the map corresponding to the graph shown in FIG. 9.

At step S200, assuming Rr to be a rear wheel tire radius, the target driving torque PTr of the rear wheel axle is calculated according to the following formula (15).

$$PTr = Rrl\{(1-\beta r) \times PPWrr + \beta r \times PPWrl\} \tag{15}$$

At step S210, the final target braking and driving torque KFTr of the rear wheel axle is calculated according to the following formula (16), and a signal showing this final target braking and driving torque KFTr is input to the engine control device 28.

$$KFTr = PTr - KTr \tag{16}$$

At step S220, on the basis of the right and left rear wheel target frictional braking pressures MPrl and MPrr calculated at step S160 or S180, the right and left rear wheel braking pressures Prr and Prl are controlled by pressure feedback so as to be the corresponding target braking pressures MPrr and MPrl, respectively, and then the routine returns to step S10.

As shown in FIG. 4, further, at step S22 of the calculation routine of final target braking pressure at step S20, it is judged whether or not the traction control is in process responding to the signal from the traction control device 64, and when judged to be in the process of traction control, the routine advances to step S36, and when judged not to be in the process of traction control, the routine advances to step S24.

Figure 5:
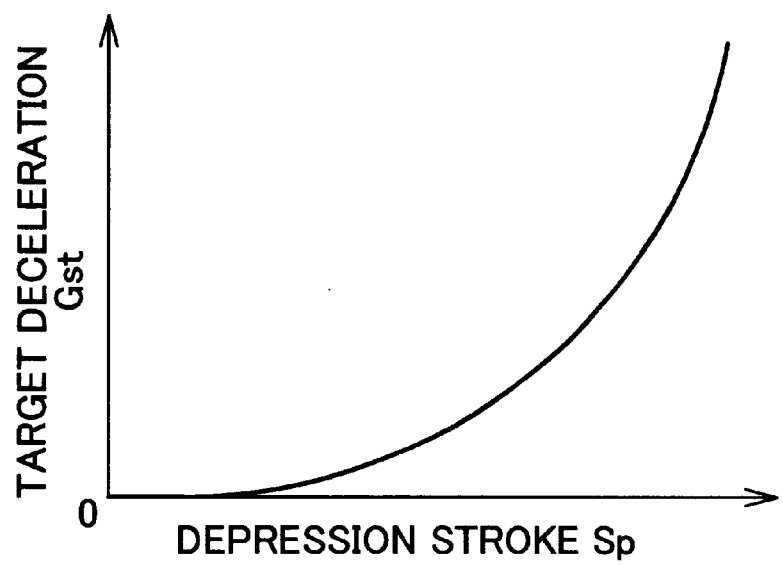
FIG. 5 is a graph showing the relation of a depression stroke Sp of a brake pedal and target deceleration Gst.
Figure 6:
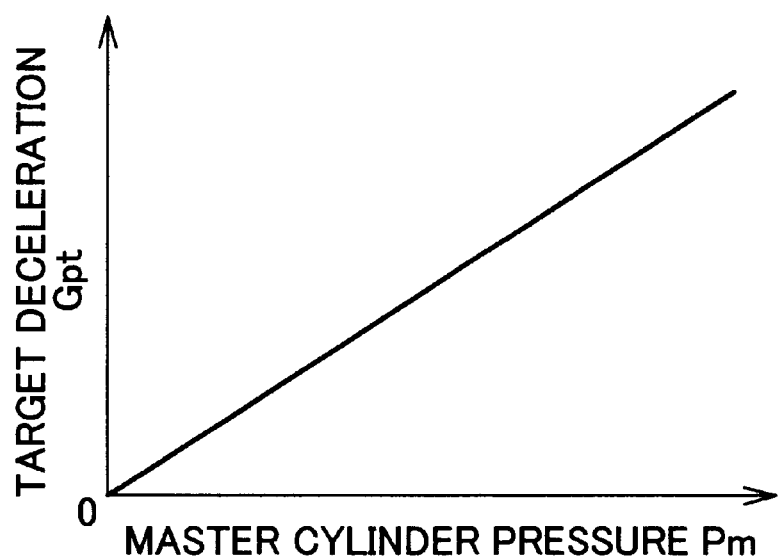
FIG. 6 is a graph showing the relation of a master cylinder pressure Pm and target deceleration Gpt.

At step S24, target deceleration Gst is calculated on the basis of the depression stroke Sp from a map corresponding to a graph shown in FIG. 5, and at step S26, further, target deceleration Gpt is calculated on the basis of the master cylinder pressure Pm from a map corresponding to a graph shown in FIG. 6.

Figure 7:
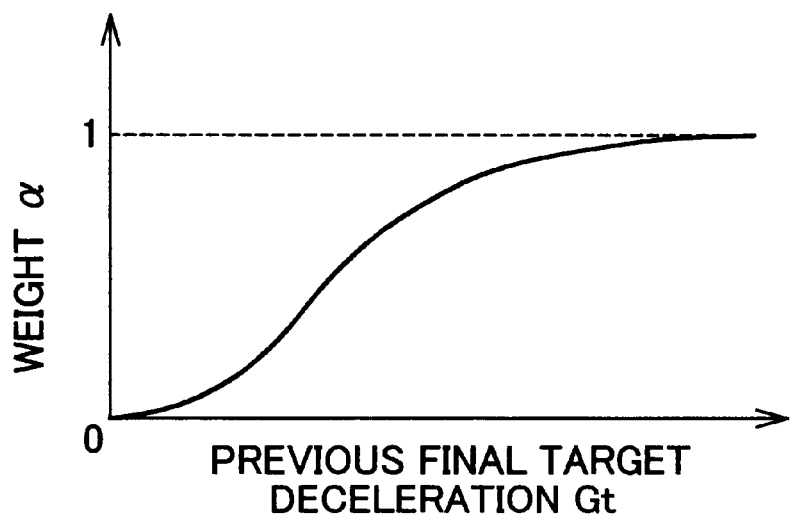
FIG. 7 is a graph showing the relation of the final target deceleration Gt calculated previously and weight $\alpha$ to the target deceleration Gpt.

At step S28, on the basis of the final target deceleration Gt calculated in the preceding cycle, the weight a ($0 \leq \alpha \leq 1$) to the target deceleration Gpt on the basis of the master cylinder pressure Pm from a map corresponding to a graph shown in FIG. 7 is calculated, and at step S30, according to the following formula (17), the final target deceleration Gt is calculated as the weighted sum of the target deceleration Gpt and target deceleration Gst.

$$Gt = \alpha \times Gpt + (1-\alpha)Gst \tag{17}$$

At step S32, assuming Kf and Kr to be coefficients (positive constants) to the distribution ratio of braking force to the front wheels and rear wheels, respectively, the front wheel target braking pressure PBf and rear wheel target braking pressure PBr are calculated according to the following formulas (18) and (19).

$$PBf = Kf \times Gt \tag{18}$$

$$PBr = Kr \times Gt \tag{19}$$

At step S34, the right and left front wheel final target braking pressures FPfr and FPfl are set at the front wheel target braking pressure PBf, and the right and left rear wheel final target braking pressures FPrr and FPrl are set at the rear wheel target braking pressure PBr, and the routine proceeds to step S50.

At step S36, on the basis of the target braking force PBWi of each wheel input from the traction control device 64, the target braking pressure PSi (i=fr, fl, rr, rl) of each wheel of traction control is calculated. At step S38, further, the final target braking pressure FPi of each wheel is set at the target braking pressure PSi (i=fr, fl, rr, rl), and the routine proceeds to step S50.

Thus, according to the illustrated first embodiment, in a normal braking mode by driver's operation at step S20, the final target braking pressure FPi of each wheel is calculated on the basis of the depression stroke Sp of the brake pedal 32, the master cylinder pressure Pm, and the front and rear wheel distribution of braking forces. In traction control, regardless of the braking operation amount by the driver, the final target braking pressure FPi of each wheel is calculated on the basis of target braking force PBWi.

At the front wheel side, at steps S50, S60, and S80, the front wheel regenerative torque KTf is calculated as a value corresponding to twice the smaller value of the right and left front wheel final target braking pressures FPfr, FPfl. At step S70 or S90, in cooperation with the regenerative brake by the regenerative torque KTf for the wheel having the larger final target braking pressure, the target frictional braking pressure MPfr or MPfl is calculated for achieving the target braking force corresponding to the final target braking pressure of that wheel, and the target frictional braking pressure MPfr or MPfl of the wheel having the smaller final target braking pressure is set to 0.

At steps S100 and S110, on the basis of the right and left front wheel target driving forces PPWfr and PPWfl input from the traction control device 64, the front wheel axle target driving torque PTf is calculated. At step S120, the front wheel axle final target driving torque KFTf is calculated as a value obtained by subtracting the front wheel regenerative torque KTf from the front wheel axle target driving torque PTf, and a signal showing the final target braking and driving torque KFTf is output to the engine control device 28. Further, at step S130, the right and left front wheel frictional braking pressures are controlled to be target frictional braking pressures MPfr and MPfl, respectively, by the frictional braking device 44.

In this case, when the final target braking and driving torque KFTf is a positive value and is a driving torque, the output of the gasoline engine 12 or the motor-generator 14 of the hybrid system 10 is controlled by the engine control device 28 so that the front wheel axle driving torque may be the final target braking and driving torque KFTf. When the final target braking and driving torque KFTf is a negative value and is a braking torque, the motor-generator 14 is controlled by the engine control device 28 so that the front wheel axle driving torque may be the final target braking and driving torque KFTf, and regenerative brake is executed by the front wheel regenerative braking device 30 at the target regenerative braking torque corresponding to the absolute value of the final target driving torque KFTf.

At the rear wheel side, at steps S140, S150, and S170, the rear wheel regenerative torque KTr is calculated as a value corresponding to twice the smaller value of the right and left rear wheel final target braking pressures FPrr and FPrl. At step S160 or S180, in cooperation with the regenerative brake by the regenerative torque KTf for the wheel having the larger final target braking pressure, the target frictional braking pressure MPrr or MPrl is calculated for achieving the target braking force corresponding to the final target braking pressure of that wheel, and the target frictional braking pressure MPrr or MPrl for the wheel having the smaller final target braking pressure is set to 0.

At steps S190 and S200, on the basis of the right and left rear wheel target driving forces PPWrr and PPWrl input from the traction control device 64, the rear wheel axle target driving torque PTr is calculated. At step S210, the rear wheel axle final target driving torque KFTr is calculated as a value obtained by subtracting the rear wheel regenerative torque KTr from the rear wheel axle target driving torque PTr, and a signal showing the final target braking and driving torque KFTr is output to the engine control device 28. Further, at step S220, the right and left rear wheel frictional braking pressures are controlled to be target frictional braking pressures MPrr and MPrl, respectively, by the frictional braking device 44.

In this case, when the final target braking and driving torque KFTr is a positive value and is a driving torque, the motor-generator 42 is controlled by the engine control device 28 so that the rear wheel axle driving torque may be the final target braking and driving torque KFTr. When the final target braking and driving torque KFTr is a negative value and is a braking torque, the motor-generator 42 is controlled by the engine control device 28 so that the rear wheel axle driving torque may be the final target braking and driving torque KFTr, and regenerative brake is executed by the rear wheel regenerative braking device 40 at the target regenerative braking torque corresponding to the absolute value of the final target driving torque KFTr.

Therefore, according to the illustrated first embodiment, the axle final target braking and driving torques KFTf and KFTr of front wheels and rear wheels are calculated. When the final target braking and driving torque is a negative value and both right and left wheels must be braked, as for the wheel having the smaller final target braking pressure, the target braking torque corresponding to the final target braking pressure is achieved by the regenerative braking torque, and as for the wheel having the larger final target braking pressure, the target braking torque corresponding to the final target braking pressure is achieved by the sum of the regenerative braking torque and frictional braking torque. Therefore, even in the case of traction control in which the right and left wheel final target braking pressures may be different from each other, the right and left wheels can be braked at the highest regeneration efficiency in both front wheels and rear wheels while satisfying the requirement of traction control.

When the final target braking and driving torque is a positive value and the vehicle driving force must be controlled, the output of the gasoline engine 12 or motor-generator 42 is controlled so that the axle driving torque may be the corresponding final target braking and driving torque, and the wheels having the larger final target braking pressure are controlled by the frictional brake at the braking torque corresponding to the deviation of the final target braking pressure. Therefore, even in the case of traction control in which the right and left wheel final target braking pressures or target driving torques may be different from each other, the right and left wheels can be controlled appropriately by frictional brake in both front wheels and rear wheels while satisfying the requirement of traction control.

In particular, according to the illustrated first embodiment, the front wheel axle target driving torque PTf and rear wheel axle target driving torque PTr are calculated as the weighted sum corresponding to the magnitude of the driving torques of the right and left wheels required by traction control, respectively. Therefore, as compared with the case of calculation of them merely as the sum of right and left wheel driving torques, the front wheel axle target driving torque PTf and the rear wheel axle target driving torque PTr can be calculated appropriately responding to the state of the wheels.

Also in the illustrated first embodiment, in the normal braking mode by the driver's operation, the ratio of the sum of right and left front wheel frictional braking torques and regenerative braking torques and the sum of right and left rear wheel frictional braking torques and regenerative braking torques is controlled so as to be always at a suitable front and rear wheel braking force distribution ratio Kf/Kr. Therefore, regardless of the rate of the frictional braking torque and regenerative braking torque, the distribution ratio of braking forces of front and rear wheels can be reliably controlled at the suitable front and rear wheel braking force distribution ratio. Accordingly, it is possible to reliably prevent drop of vehicle stability or change of steering characteristic due to deviation of the front and rear wheel braking force distribution ratio from the suitable distribution ratio.

Figure 10:
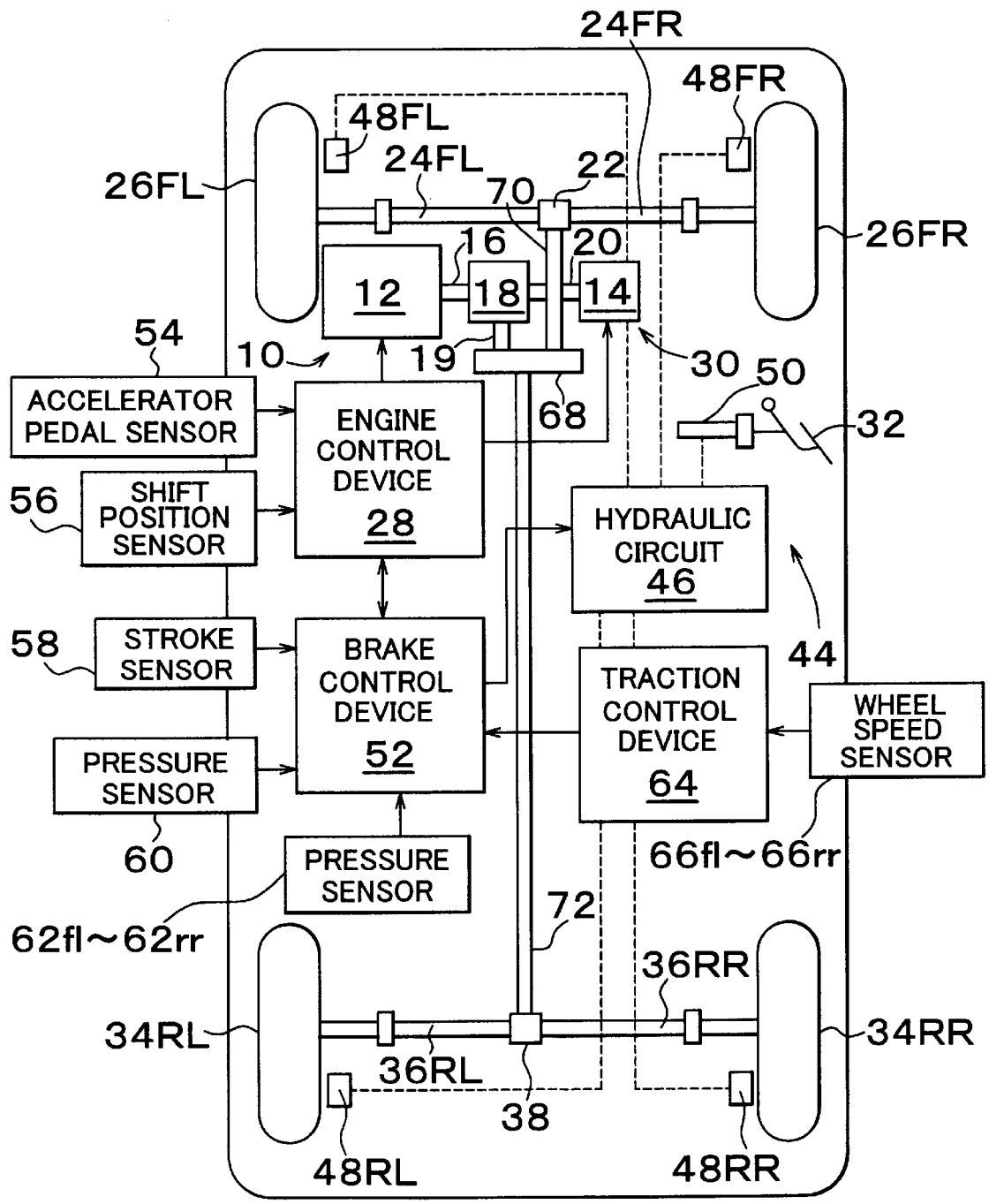
FIG. 10 is a schematic structural diagram showing a second embodiment of a braking and driving force control apparatus of the invention applied to a four-wheel drive vehicle having a hybrid system.
Figure 11:
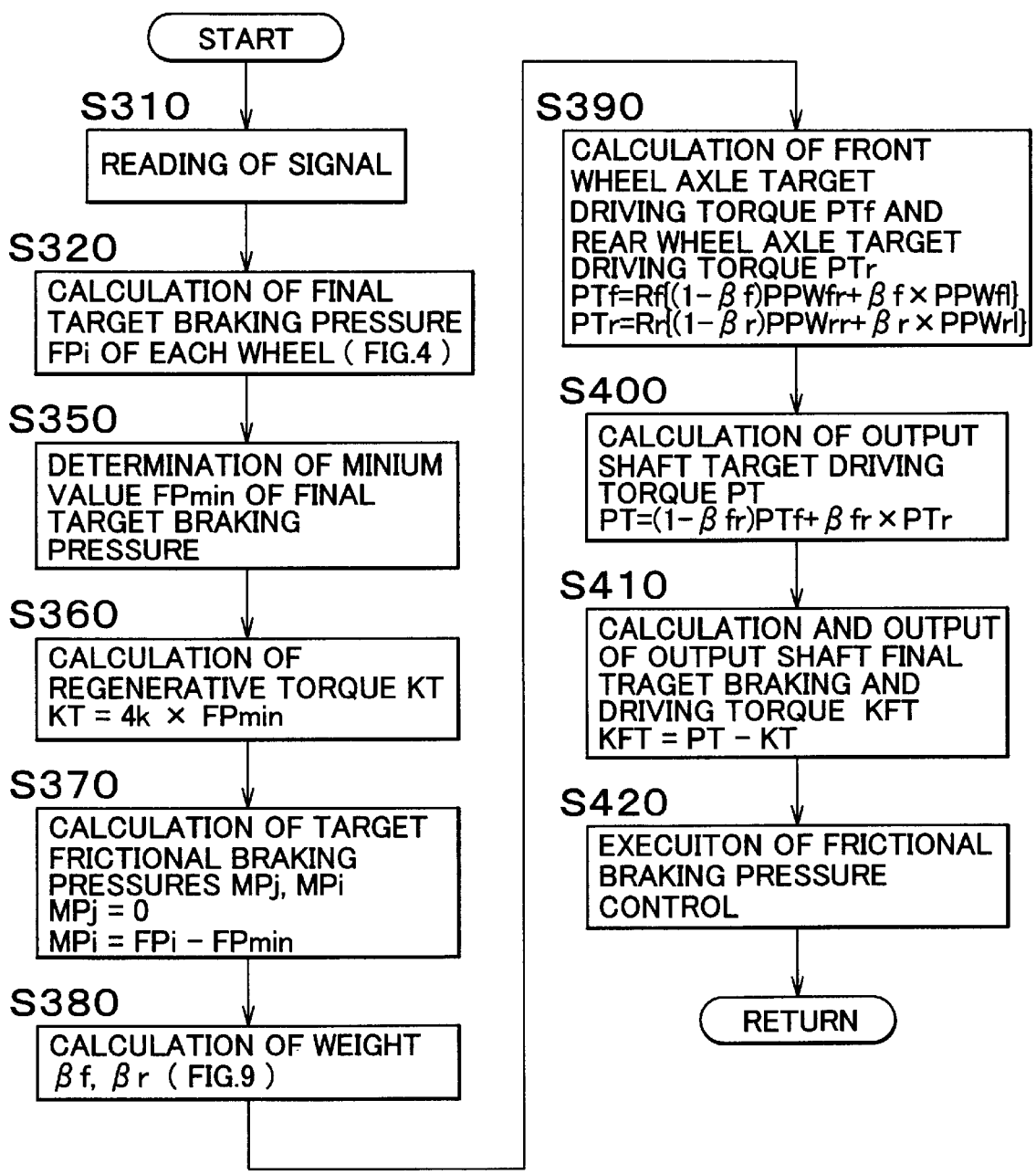
FIG. 11 is a flowchart showing a main routine of braking force control by the braking and driving force control apparatus in the second embodiment.

FIG. 10 is a schematic structural diagram showing a second embodiment of a braking and driving force control apparatus of the invention applied to a four-wheel drive vehicle having a hybrid system. FIG. 11 is a flowchart showing a main routine of braking force control by the braking and driving force control apparatus in the second embodiment. In FIG. 10, the same elements shown in FIG. 1 are identified with the same reference numerals.

In this embodiment, rotation of the output shaft 19 of the continuously variable transmission 18 is transmitted to a front wheel propeller shaft 70 and a rear wheel propeller shaft 72 through a center differential 68, and the front and rear wheel distribution of driving forces by the center differential 68 is controlled by a four-wheel drive control device (not shown).

The driving force of the front wheel propeller shaft 70 is transmitted to the left front wheel axle 24FL and the right front wheel axle 24FR by way of the front wheel differential 22, so that right front wheel 26FR and left front wheel 26FL are rotated and driven. Similarly, the driving force of the rear wheel propeller shaft 72 is transmitted to the right rear wheel axle 36RR and the left rear wheel axle 36RL by way of the rear wheel differential 38, so that right rear wheel 34RR and left rear wheel 34RL are rotated and driven.

In this embodiment, therefore, the hybrid system 10 functions as a drive device for generating a common driving force in right and left front wheels and right and left rear wheels, and the regenerative braking device 30 including the motor-generator 14 functions as a regenerative braking device for generating a common braking force in right and left front wheels and right and left rear wheels.

In this embodiment, first at step S310, signals including the signal showing the depression stroke Sp of the brake pedal 32 detected by the stroke sensor 58 are read in. Further, at step S320, according to the routine shown in FIG. 4, the final target braking pressure FPi (i=fr, fl, rr, rl) of each wheel is calculated.

At step S350, the smallest value of the final target braking pressures FPi of the wheels is determined to be FPmin, and at step S360, the regenerative torque KT that can be produced by the regenerative braking device 30 is calculated according to the following formula (20).

$$KT = 4k \times FPmin \tag{20}$$

At step S370, the target frictional braking pressure MPi of the wheel having the smallest final target braking pressure FPi is set to 0, and the target frictional braking pressures MPi of another wheel is set according to the following formula (21).

$$Mpi = Fpi - FPmin \tag{21}$$

At step S380, deviation ΔPPWf=PPWfl−PPWfr of right and left front wheel target driving torque instruction values and deviation ΔPPWr=PPWrl−PPWrr of right and left rear wheel target driving torque instruction values, which are input from the traction control device 64, are calculated, and on the basis of the deviations ΔPPWf and ΔPPWr, the weights βf and βr are calculated from the maps corresponding to the graphs shown in FIG. 9.

At step S390, the target driving torque PTf of the front wheel axle and target driving torque PTr of the rear wheel axle are calculated by the following formulas (22) and (23).

$$PTf = Rf \times \{(1-\beta f) \times PPWfr + \beta f \times PPWfl\} \tag{22}$$

$$PTr = Rr \times \{(1-\beta r) \times PPWrr + \beta r \times PPWrl\} \tag{23}$$

Proceeding to step S400, assuming βfr to be a driving force distribution ratio of the rear wheels to the front wheels, on the basis of the target driving torque PTf of the front wheel axle and target driving torque PTr of the rear wheel axle, the target driving torque PT of the output shaft 19 of the hybrid system 10 is calculated by the following formula (24).

$$PT = (1-\beta fr) \times PTf + \beta fr \times PTr \tag{24}$$

At step S410, the final target braking and driving torque KFT of the output shaft 19 of the hybrid system 10 is calculated by the following formula (25), and a signal showing this final target braking and driving torque KFT is output to the engine control device 28.

$$KFT = PT - KT \tag{25}$$

At step S420, on the basis of the target frictional braking pressure MPi of each wheel calculated at step S370, the braking pressure Pi of each wheel is controlled by pressure feedback so as to become the corresponding target braking pressure MPi individually, and then the routine returns to step S310.

According to the second embodiment, at steps S320 to S360, the regenerative torque KT is calculated as a value four times the smallest value FPmin of the final target braking pressures of wheels Fpi. At step S370, the target frictional braking pressure MPi of the wheel having the smallest final target braking pressure FPi is set to 0, while the target frictional braking pressures MPi of other wheels are set by FPi−FPmin, respectively.

In this second embodiment, therefore, similar to the first embodiment described above, when the final target braking and driving torque KFT is a negative value and each wheel is to be braked, as for the wheel having the smaller final target braking pressure, the target braking torque corresponding to the final target braking pressure is achieved by the regenerative braking torque, and as for the other wheels, the target braking torque corresponding to the final target braking pressure is achieved by the sum of the regenerative braking torque and the frictional braking torque. Therefore, even in the case of traction control in which the final target braking pressures of the wheels may be different from each other, the wheels can be braked at the highest regeneration efficiency while satisfying the requirement of the traction control. Alternatively, when the final target braking and driving torque KFT is a positive value and the vehicle driving force must be controlled, the output of the gasoline engine 12 or motor-generator 42 is controlled so that the output shaft driving torque may be the corresponding final target braking and driving torque, and the other wheels than the wheel having the smallest final target braking pressure are controlled by the frictional brake at the braking torque corresponding to the deviation of the final target braking pressure. Therefore, even in the case of traction control in which the final target braking pressures and target driving torques of wheels may be different from each other, the wheels can be controlled appropriately by a frictional brake while satisfying the requirement of the traction control.

Figure 12:
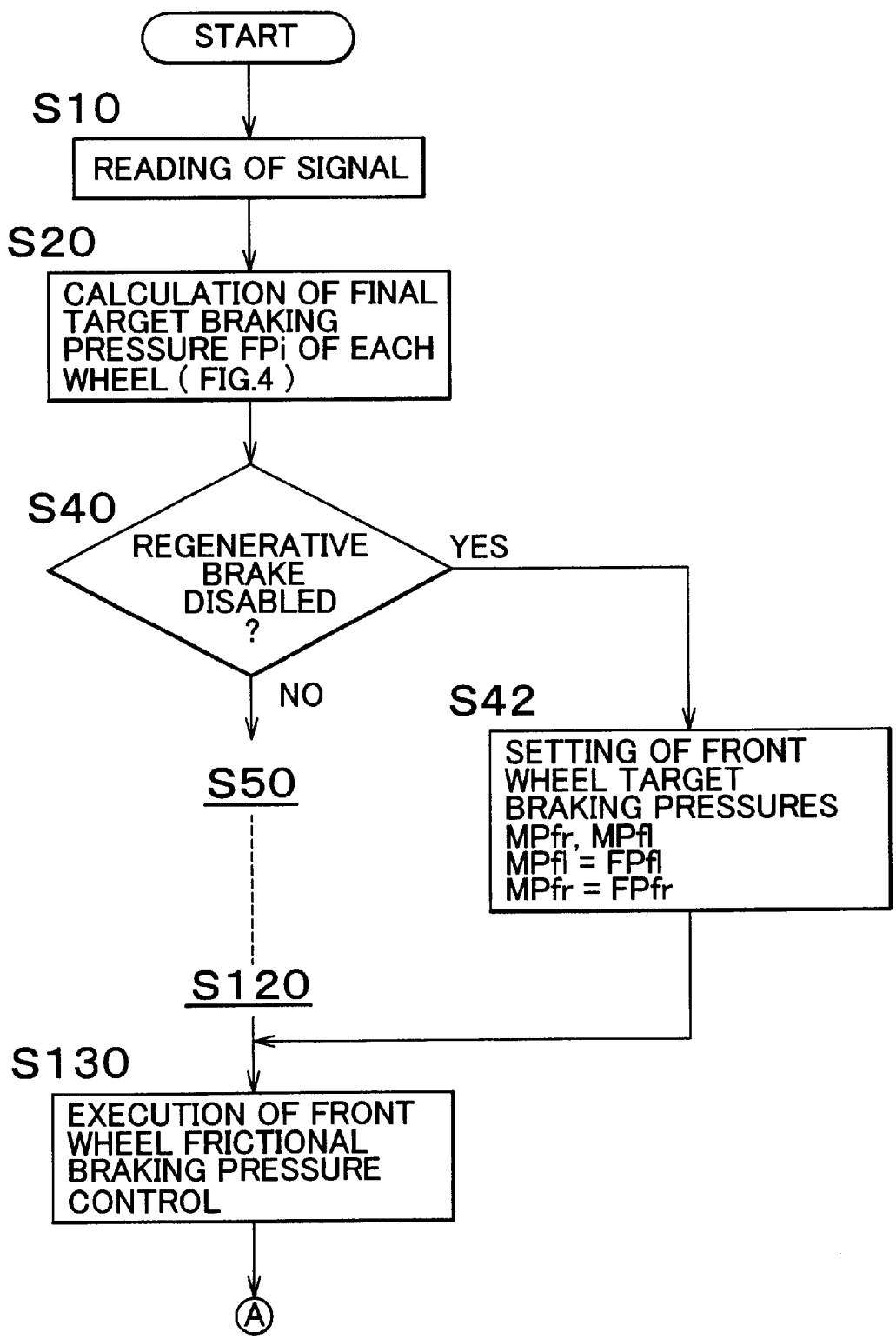
FIG. 12 is a flowchart showing a part of a main routine of braking force control in a first modification of the first embodiment.
Figure 13:
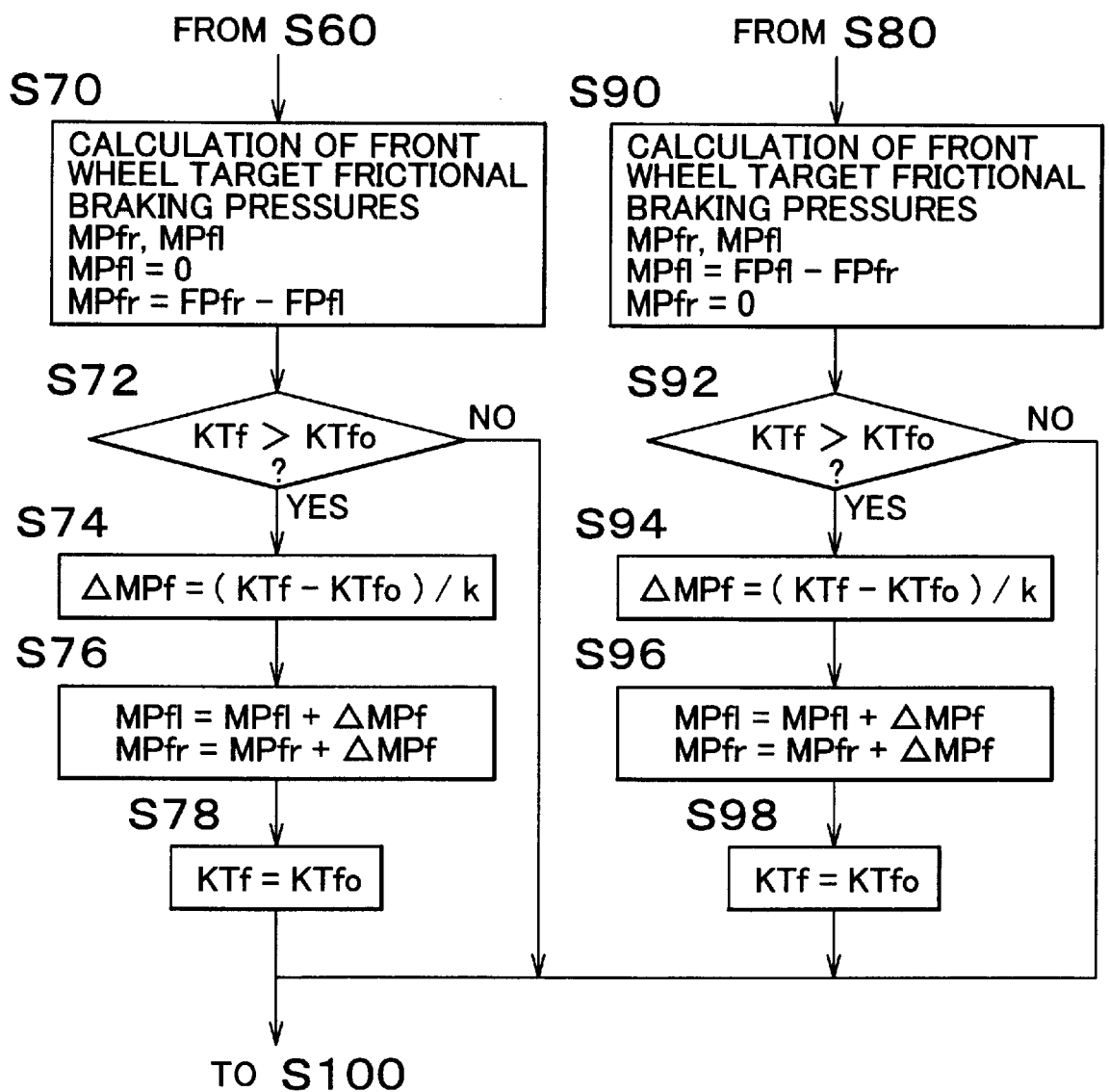
FIG. 13 is a flowchart showing a part of a main routine of braking force control in a second modification of the first embodiment.

FIG. 12 and FIG. 13 are flowcharts showing parts of a main routine of braking force control in first and second modifications of the first embodiment, respectively. In FIG. 12 and FIG. 13, the same steps as shown in FIG. 2 are identified with the same step numbers.

The first modification shown in FIG. 12 is a modification adopted for a case including a mode in which the hybrid system 10 cannot stop the operation of the gasoline engine 12 and the regenerative brake cannot be applied, for example, a power generation mode in which power is generated by driving the motor-generator 14 by the gasoline engine 12.

In this first modification, as shown in FIG. 12, at step S40 to be executed after step S20, it is judged whether or not regenerative brake by the front wheel regenerative braking device 30 is disabled, and the routine proceeds to step S50 when judged negatively, while if judged affirmatively, the front wheel target braking pressures MPfr and MPfl are set to be FPfr and FPfl at step S42, respectively, and then the routine goes to step S130.

Therefore, according to the first modification, the same action and effect as in the first embodiment are obtained. However, when operated in a mode where the hybrid system 10 cannot stop the operation of the gasoline engine 12 and the regenerative brake cannot be applied, the same operation as in the first embodiment is assured for the rear wheels, while the front wheels can be braked reliably as specified by the frictional brake.

The second modification shown in FIG. 13 is a modification adopted for a case in which the regenerative braking torque that can be generated by the regenerative braking device is relatively limited as compared with the braking torque required for wheels.

In the second modification, as shown in FIG. 13, it is assumed that KTF0 is the maximum regenerative braking torque that can be generated by the front wheel regenerative braking device 30, and at step S72 to be executed after step S70, it is judged whether or not the front wheel regenerative torque KTf exceeds the maximum value KTf0. The routine proceeds to step S100 when judged negatively, while proceeding to step S74 when judged affirmatively.

At step S74, a correction value ΔMPf of front wheel target frictional braking pressure is calculated according to the following formula (26). At step S76, the right and left front wheel target frictional braking pressures MPfr and MPfl are corrected according to the following formulas (27) and (28), respectively. Further, at step S78, the front wheel regenerative torque KTf is set to the maximum value KTf0. Then the routine goes to step S100.

$$\Delta MPf=(KTf-KTf0)/k \quad (26)$$

$$MPfr=MPfr+\Delta MPf \quad (27)$$

$$MPfl=MPfl+\Delta MPf \quad (28)$$

At step S92 to be executed after step S90, it is judged the same as at step S72. The routine goes to step S100 directly when judged negatively, while going to steps S94 through S98 when judged affirmatively to be processed the same as at steps S74 through S78.

Although not shown in the diagram, in this second modification, after steps S160 and S180, the same process as at steps S72 through S78 and steps S92 through S98 is executed.

Therefore, according to the second modification, when the regenerative torque exceeds the maximum value that can be generated by the regenerative braking device, the regenerative torque is set to the corresponding maximum value, and if insufficient, it is supplemented by the frictional braking torque. Accordingly, even when the regenerative capacity of the regenerative braking device is relatively low, the same action and effect as in the first embodiment can be obtained.

Herein, the invention is explained specifically by referring to specific embodiments, but the invention is not limited to these embodiments.

For example, in the foregoing embodiments and modifications, the motion control device for calculating the target braking torque or the target driving torque of the wheels responding to the vehicle running state is the traction control device. However, the device for calculating the target braking torque and target driving torque, or the target braking force and the target driving force of the wheels responding to the vehicle running state may be an anti-skid control device, a behavior control device for stabilizing the vehicle behavior by providing the vehicle with yaw moment or deceleration, a braking force distribution control device for controlling distribution of the braking force of the wheels responding to the vehicle running state, or the like.

In the foregoing embodiments and modifications, the traction control device 64 outputs the target braking force or the target driving force of each wheel to the brake control device 52, and the brake control device 52 calculates the target braking torque on the basis of the target braking force. However, the traction control device 64 may also output the target wheel speed or the target slip rate of each wheel to the brake control device 52, and the brake control device 52 may calculate the target braking torque or the target driving torque of each wheel on the basis of the target vehicle speed or the target slip rate.

Herein, only the first embodiment is presented together with first and second modifications, but the second embodiment may be also modified according to the first or second modification.

In the foregoing embodiments, the vehicle target deceleration Gt is calculated on the basis of the depression stroke Sp of brake pedal 32 and master cylinder pressure Pm, and the final target braking pressure FPi of each wheel is calculated on the basis of the target deceleration. However, the final target braking pressure of each wheel may be calculated on the basis of the depression stroke Sp or the master cylinder pressure Pm.

Figure 8:
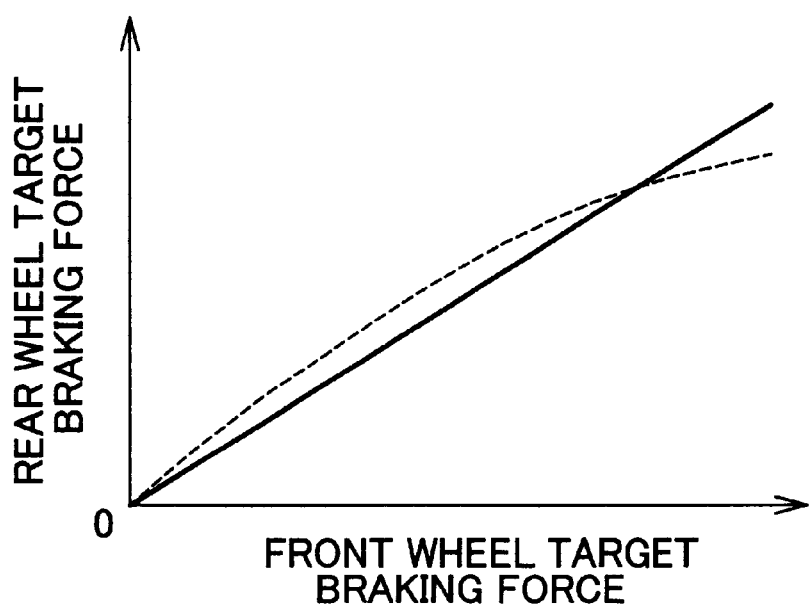
FIG. 8 is a graph showing the relation of a target braking force of front wheels and a target braking force of rear wheels.

Also in the foregoing embodiments, the front and rear wheel distribution ratio Kf/Kr of the braking force is constant regardless of the magnitude of the target braking force. However, for example, as indicated by the broken line in FIG. 8, it may be modified so that the braking force distribution ratio of rear wheels to the front wheels may be smaller as the target braking force becomes greater.

In the foregoing embodiments and modifications, the drive device is the hybrid system 10 including the gasoline engine 12 and motor-generator 14, and the motor-generator 14 serves as the generator for the regenerative brake. However, the internal combustion engine used in the hybrid system may be an internal combustion engine such as diesel engine, and the drive device may be an ordinary gasoline internal combustion engine, and the generator for the regenerative brake may be independent of the internal combustion engine.

In the foregoing embodiment, the vehicle is a four-wheel drive vehicle, but the vehicle of the invention may be also a front-wheel drive vehicle or a rear-wheel drive vehicle. Further, the rear wheel motor-generator 40 functions as an auxiliary drive source for driving the rear wheels, but it also may be modified to serve, for example, only as the generator for regenerative brake.

In the illustrated embodiment, a controller (each, or the combination of, control devices 28, 52 and 64) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A braking and driving force control apparatus for a vehicle having a frictional braking device for applying a braking force individually to each wheel and a regenerative braking device for generating a common braking force to a plurality of the wheels, comprising a controller that:
    calculates a target braking force of each wheel in response to a running state of the vehicle; and
    controls the frictional braking device and the regenerative braking device so that the braking force of each wheel becomes the target braking force,
    wherein the controller controls the regenerative braking device so as to achieve a smallest target braking force of the target braking forces of the plurality of wheels, and controls the frictional braking device so as to achieve the target braking force of another wheel, different from the wheel having the smallest target braking force, in cooperation with the regenerative braking device.

2. The braking and driving force control apparatus according to claim 1, wherein the controller calculates the target braking force of each wheel in response to a brake operation amount by a driver of the vehicle in a normal running state of a vehicle, and calculates the target braking force of each wheel in response to the vehicle running state during vehicle motion control.

3. The braking and driving force control apparatus according to claim 2, wherein the controller calculates the target braking force in order to suppress brake slip when the brake slip of the wheels is above a predetermined threshold.

4. The braking and driving force control apparatus according to claim 2, wherein the controller calculates the target braking force in order to suppress drive slip when the drive slip of the wheels is above a predetermined threshold.

5. The braking and driving force control apparatus according to claim 2, wherein the controller calculates the target braking force of each wheel in order to stabilize the vehicle when the vehicle behavior is unstable.

6. The braking and driving force control apparatus according to claim 2, wherein the controller calculates the target braking force of each wheel in order to control a braking force distribution ratio among the wheels in response to the vehicle running state.

7. The braking and driving force control apparatus according to claim 1, wherein the plurality of wheels are right and left wheels, and the controller controls the regenerative braking device to achieve the smaller target braking force of the right and left wheel target braking forces, and controls the frictional braking device to achieve the target braking force of the wheel having the larger target braking force in cooperation with the regenerative braking device.

8. The braking and driving force control apparatus according to claim 1, wherein the regenerative braking device includes a motor-generator that operates with an internal combustion engine in a hybrid system.

9. A braking and driving force control apparatus for a vehicle having a frictional braking device for applying a braking force individually to each wheel, a regenerative braking device for generating a common braking force to a plurality of the wheels, and a drive device for generating a common driving force to the plurality of wheels, comprising a controller that:
    calculates a target braking force of each wheel in response to a running state of the vehicle;
    calculates a target driving force of each wheel in response to the running state of the vehicle; and
    controls the frictional braking device, the regenerative braking device, and the drive device so that a braking and driving force of each wheel becomes the target braking and driving force on the basis of the target braking force and the target driving force,
    wherein the controller calculates an entire target driving force of the plurality of wheels on the basis of the target driving force of each wheel, calculates an entire target braking and driving force of the plurality of wheels on the basis of the entire target driving force of the plurality of wheels and a smallest target braking force of the target braking forces of the plurality of wheels,
    when the entire target braking and driving force of the plurality of wheels is a driving force, the controller controls the drive device so as to achieve the entire target braking and driving force of the plurality of wheels, and controls the frictional braking device so as to achieve the target braking force of another wheel, different from the wheel having the smallest target braking force, and
    when the entire target braking and driving force of the plurality of wheels is a braking force, the controller controls the regenerative braking device so as to achieve the entire target braking and driving force of the plurality of wheels, and controls the frictional braking device so as to achieve the target braking force of the another wheel, different from the wheel having the smallest target braking force in cooperation with the regenerative braking device.

10. The braking and driving force control apparatus according to claim 9, wherein the controller calculates the target braking force of each wheel in response to a brake operation amount by a driver of the vehicle in a normal running state of the vehicle, and calculates the target braking force of each wheel in response to the vehicle running state during vehicle motion control.

11. The braking and driving force control apparatus according to claim 10, wherein the controller calculates the target driving force of each wheel in response to the vehicle running state during the vehicle motion control.

12. The braking and driving force control apparatus according to claim 11, wherein the controller calculates the target driving force in order to suppress drive slip when the drive slip of the wheels is above a predetermined threshold.

13. The braking and driving force control apparatus according to claim 10, wherein the controller calculates the target braking force in order to suppress brake slip when the brake slip of the wheels is above a predetermined threshold.

14. The braking and driving force control apparatus according to claim 10, wherein the controller calculates the target braking force in order to suppress drive slip when the drive slip of the wheels is above a predetermined threshold.

15. The braking and driving force control apparatus according to claim 10, wherein the controller calculates the target braking force of each wheel in order to stabilize the vehicle when the vehicle behavior is unstable.

16. The braking and driving force control apparatus according to claim 10, wherein the controller calculates the target braking force of each wheel in order to control a braking force distribution ratio among the wheels in response to the vehicle running state.

17. The braking and driving force control apparatus according to claim 9, wherein the controller calculates the target driving force of each wheel in response to the vehicle running state during vehicle motion control.

18. The braking and driving force control apparatus according to claim 17, wherein the controller calculates the target driving force in order to suppress drive slip when the drive slip of the wheels is above a predetermined threshold.

19. The braking and driving force control apparatus according to claim 9, wherein the controller calculates the entire target braking and driving force of the plurality of wheels on the basis of a value obtained by subtracting a product of the smallest target braking force and a total number of the wheels from the entire target driving force of the plurality of wheels.

20. The braking and driving force control apparatus according to claim 19, wherein the plurality of wheels are right and left wheels, and the controller calculates the entire target braking and driving force of the plurality of wheels on the basis of a value obtained by subtracting a value twice the smallest target braking force from the entire target driving force of the plurality of wheels.

21. The braking and driving force control apparatus according to claim 19, wherein the plurality of wheels are right and left front wheels and right and left rear wheels, and the controller calculates the entire target braking and driving force of the plurality of wheels on the basis of a value obtained by subtracting a value four times the smallest target braking force from the entire target driving force of the plurality of wheels.

22. The braking and driving force control apparatus according to claim 9, wherein the drive device is a hybrid system including an internal combustion engine and a motor-generator which cooperate with each other, and the regenerative braking device includes the motor-generator.

23. The braking and driving force control apparatus according to claim 9, wherein the regenerative braking device and the drive device include a motor-generator.

24. A method for controlling a braking and driving force for a vehicle having a frictional braking device for applying a braking force individually to each wheel and a regenerative braking device for generating a common braking force to a plurality of the wheels, comprising the steps of:

calculating a target braking force of each wheel in response to a running state of the vehicle;

controlling the regenerative braking device so as to achieve a smallest target braking force of the target braking forces of the plurality of wheels; and controlling the frictional braking device so as to achieve the target braking force of another wheel, different from the wheel having the smallest target braking force, in cooperation with the regenerative braking device.

25. A method for controlling a braking and driving force for a vehicle using a frictional braking device for applying a braking force individually to each wheel and a regenerative braking device for generating a common braking force to a plurality of the wheels, comprising the steps of:

calculating a target braking force and a target driving force of each wheel in response to a running state of the vehicle;

calculating an entire target braking and driving force of the plurality of wheels on the basis of the entire target driving force of the plurality of wheels and a smallest target braking force of the target braking forces of the plurality of wheels;

when the entire target braking and driving force of the plurality of wheels is a driving force, controlling a drive device so as to achieve the entire target braking and driving force of the plurality of wheels, and controlling the frictional braking device so as to achieve the target braking force of another wheel, different from a wheel having the smallest target braking force, and when the entire target braking and driving force of the plurality of wheels is a braking force, controlling the regenerative braking device so as to achieve the entire target braking and driving force of the plurality of wheels, and controlling the frictional braking device so as to achieve the target braking force of the another wheel, different from the wheel having the smallest target braking force, in cooperation with the regenerative braking device.

* * * * *